(12) United States Patent
Ross et al.

(10) Patent No.: US 8,875,775 B2
(45) Date of Patent: Nov. 4, 2014

(54) HOOK FOR AUTO-RELEASE SHADE

(71) Applicant: Toyota Motor Engineering & Manufacturing North America, Inc., Erlanger, KY (US)

(72) Inventors: Devon Marie Ross, Howell, MI (US); Michael Anthony Zielinski, Novi, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 30 days.

(21) Appl. No.: 13/652,130

(22) Filed: Oct. 15, 2012

(65) Prior Publication Data

US 2014/0102647 A1   Apr. 17, 2014

(51) Int. Cl.
*B60J 1/20* (2006.01)
*B60J 3/00* (2006.01)
*B60J 11/00* (2006.01)

(52) U.S. Cl.
USPC ............... 160/370.22; 160/370.21; 296/97.8

(58) Field of Classification Search
CPC ........ B60J 1/2013; B60J 1/2036; B60J 11/08; B60J 1/2047; B60J 1/2083; E06B 9/54; E06B 9/42; E06B 9/56; E06B 9/40
USPC ............... 160/27, 28, 290.1, 370.21, 370.22; 248/301, 304, 306, 690, 692, 266–272; 296/143, 146.1, 152, 155, 97.6–97.9
See application file for complete search history.

(56) References Cited

U.S. PATENT DOCUMENTS

| | | | | |
|---|---|---|---|---|
| 4,124,189 | A | * | 11/1978 | Einhorn ................ 248/489 |
| 5,605,370 | A | | 2/1997 | Ruiz |
| 6,145,573 | A | * | 11/2000 | Chen ................. 160/368.1 |
| 6,227,600 | B1 | | 5/2001 | Chen |
| 7,121,610 | B2 | | 10/2006 | Nguyen |
| 2007/0029058 | A1 | * | 2/2007 | Lin ................... 160/370.22 |
| 2011/0175407 | A1 | | 7/2011 | Sharapov et al. |
| 2012/0222829 | A1 | * | 9/2012 | Lin ....................... 160/340 |
| 2012/0228896 | A1 | * | 9/2012 | Medlar et al. ........ 160/368.1 |

* cited by examiner

*Primary Examiner* — Katherine Mitchell
*Assistant Examiner* — Jeremy Ramsey
(74) *Attorney, Agent, or Firm* — Gifford, Krass, Sprinkle, Anderson & Citkowski, P.C.

(57) ABSTRACT

A window shade of the present invention can include a retractable window shade housed in a door of a vehicle, the window shade operable to extend over a window of the vehicle to be secured with a plurality of hooks located above the window. These hooks are specially designed to allow an improperly attached retractable window shade to detach and retract upon the application of a longitudinal force applied to the improperly attached retractable window shade.

15 Claims, 3 Drawing Sheets

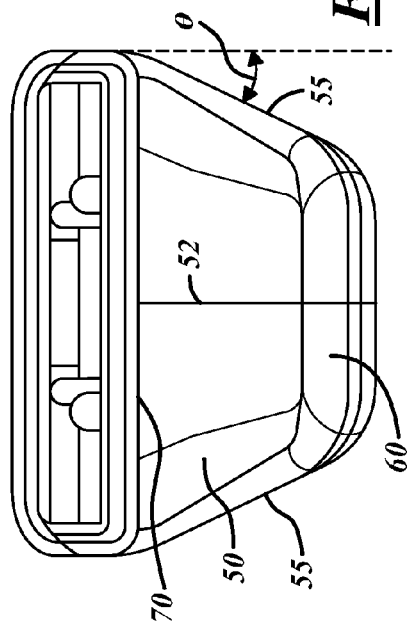
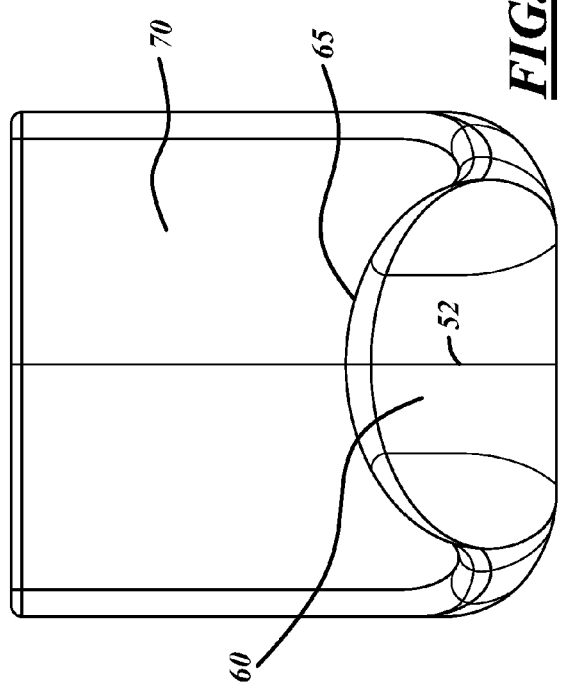
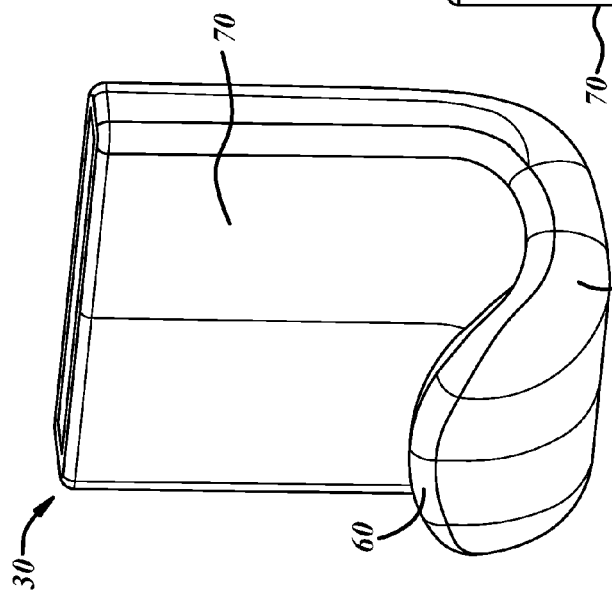
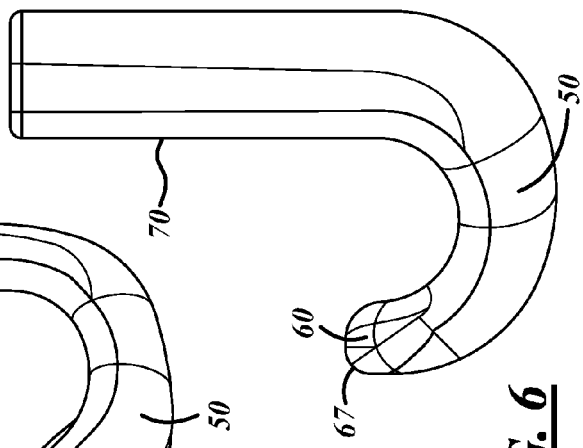

HOOK FOR AUTO-RELEASE SHADE

FIELD OF THE INVENTION

The present invention relates to window shades, specifically to retractable window shades in a motor vehicle which secure with a hook and slot type mechanism.

BACKGROUND OF THE INVENTION

Window shades, particularly window shades for a vehicle, are known. These window shades can be operable to block sunlight entering a window of the vehicle to help control the vehicle's cabin temperature, as well as reduce UV rays entering the vehicle, and provide a better environment for the vehicle passengers by reducing brightness, glare, etc. Window shades also come in multiple forms including built in window shades which can be retractable into a housing of some sort.

Retractable window shades are typically housed within a portion of a vehicle door below the window in the door. The retractable window shade can be drawn up to extend over the window and attach to a plurality of hooks to hold the retractable window shade in place. When the retractable window shade is detached from the hooks, the retractable window shade can retract into the portion of the vehicle door below the window, typically with a spring type retraction mechanism.

Retractable window shades are often utilized in rear doors, for example, a sliding door on a passenger compartment of a minivan. However, a problem can arise when a retractable window shade is not properly attached to the hooks, for example, when a driver reaches behind to pull up the retractable window shade and attaches the retractable window shade to the hooks without ensuring that all of the hooks are properly attached. This improper attachment can result in, for example, only a front hook of the window shade being attached. The retractable window shade in the sliding door which is attached using only the front hook may become damaged when the sliding door is opened if a rear of the retractable window shade which is unsecured becomes jammed or lodged in a body portion of the vehicle when the door is opened. As such, an improved retractable window shade hook mechanism is desired to help prevent damage to the retractable window shade upon operation of the sliding door.

SUMMARY OF THE INVENTION

An assembly of covering a window of a vehicle includes a retractable window shade housed in a door of a vehicle below the window, the window shade operable to extend over a window of the vehicle to be secured with a plurality of hooks located above the window. The hooks are specially designed to allow an improperly attached retractable window shade, such as the retractable window shade being attached to only one of the hooks, to detach from the hook and retract into the housing beneath the window of the door upon the application of a longitudinal force applied to the improperly attached retractable window shade.

The hook of the present invention has a bottom portion with a tapered profile which urges the improperly attached retractable window shade towards a lip portion of the hook when the longitudinal force is applied. The lip portion has a first arcuate profile when viewed from the front and a second arcuate profile when viewed from the side, the profiles urging the retractable window shade in an upward direction when the lateral force is applied. The urging provided by the bottom portion and the lip portion when a longitudinal force is applied to the retractable window shade causes the retractable shade to be displaced up and over the lip portion and allows the retraction of the retractable window shade into the door panel without damage thereto. It is appreciated that the first and second arcuate profiles could have other profiles which assist in urging the window shape towards release such as a bevel, taper, chamfer, etc.

BRIEF DESCRIPTION OF THE DRAWINGS

FIG. 5 shows a perspective view of a hook according to an embodiment of the present invention;

FIG. 6 shows a side view of the hook shown in FIG. 5;

FIG. 7 shows a top view of the hook shown in FIG. 5; and

FIG. 8 shows a front view of the hook shown in FIG. 5.

DETAILED DESCRIPTION OF THE PREFERRED EMBODIMENT

Figure 1:
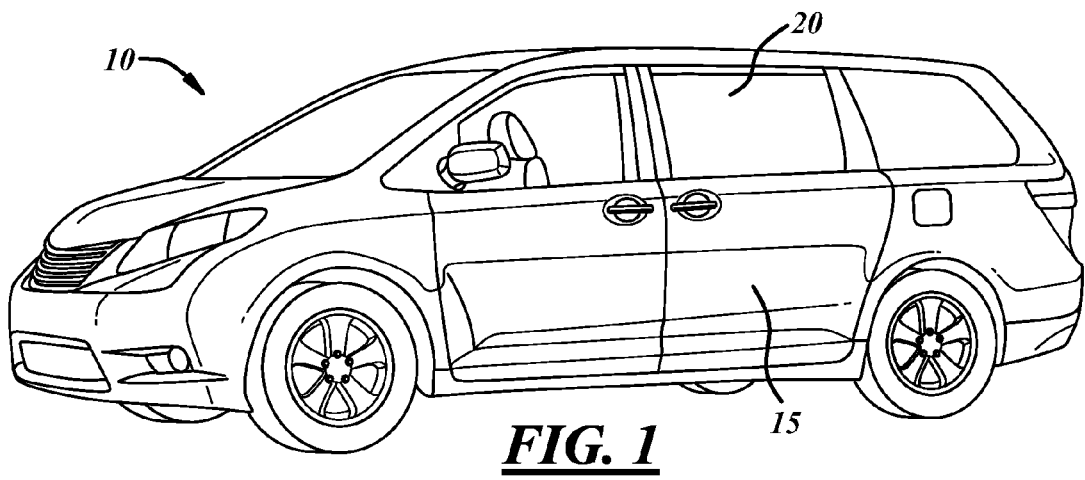
FIG. 1 shows a perspective view of a vehicle having a sliding door.

Turning now to the figures, FIG. 1 shows a vehicle 10 having a sliding door 15 and a window 20. The vehicle 10 of the preferred embodiment is a minivan, however, other vehicles, such as a sedan, sport utility vehicle, full size van, bus, truck or any other vehicle known to those skilled in the art can be used. The sliding door 15 can be either manually opened with an effort provided by a user, or can be opened remotely with an electric motor, hydraulic actuator, or any other motor or actuator known to those skilled in the art. The motor or actuator can be activated by a user input such as a push button, switch or remote, or can be activated automatically by a sensor detecting motion, the presence of a RFID tag, and the like.

Figure 2:
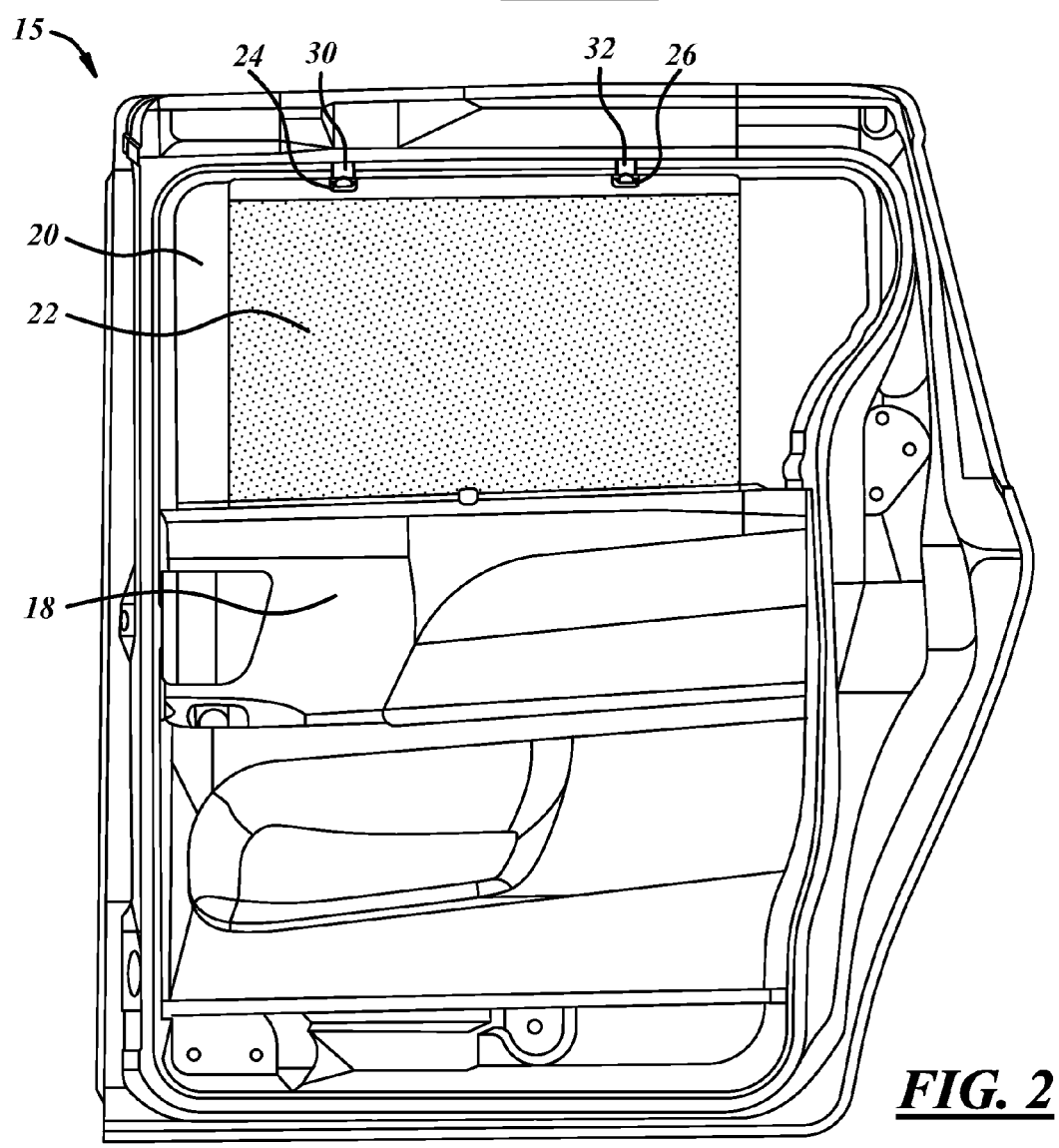
FIG. 2 shows a perspective view of an inner side of the sliding door.

FIG. 2 shows an inner side of the sliding door 15, the sliding door 15 having a lower portion 18 which houses a retractable window shade 22, the retractable window shade 22 is extendable over the window 20 to be received by a front hook 30 in a front hook receiving slot 24 and a back hook 32 in a back hook receiving slot 26. It is appreciated that the retractable window shade 22 shown in FIG. 2 is properly attached to both the front hook 30 and the back hook 32 with the relative front hook receiving slot 24 and back hook receiving slot 26.

The retractable window shade 22 can be a mesh type material that allows light to pass through a plurality of open spaces, a semi-transparent material allowing a portion of light to pass through, or an opaque material blocking all light. The retractable window shade can be made of cotton, acrylic, a plastic laminar material, or any other material known to those skilled in the art. The front hook 30 and the back hook 32 can be made of plastic, wood, metal or any other material known to those skilled in the art.

Figure 3:
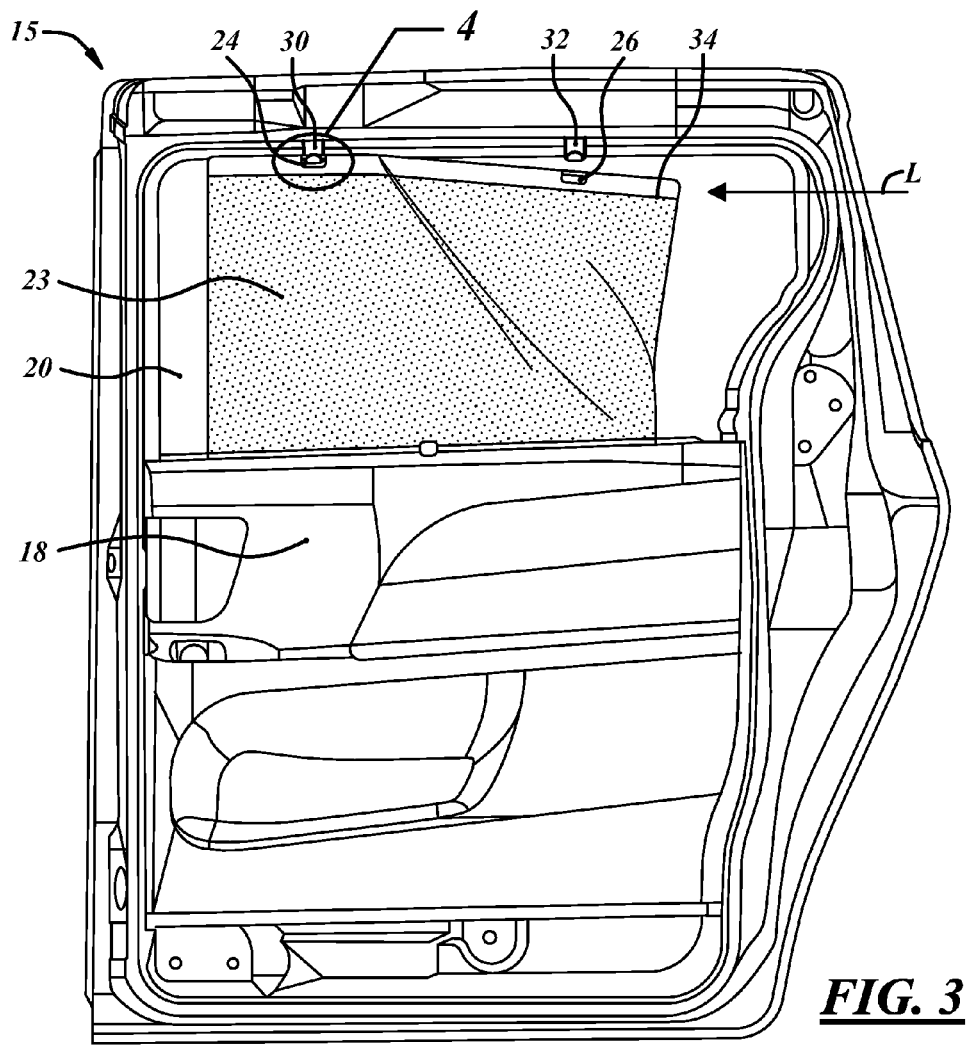
FIG. 3 shows a perspective view of the inside of the sliding door having a improperly attached retractable window shade.
Figure 4:
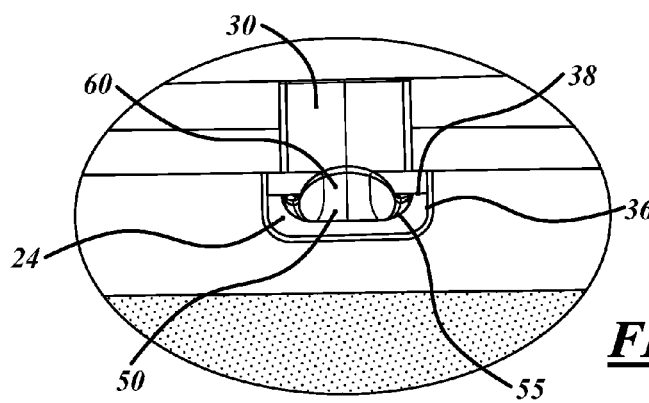
FIG. 4 shows a perspective of an enlarged view of the circled region labeled 4 in FIG. 3.

FIG. 3 shows the sliding door 15 of the vehicle 10 having an improperly attached retractable window shade 23 covering the window 20, with the window shade 23 attached to the front hook 30 via the front hook receiving slot 24 while the back hook receiving slot 26 is not attached to the back hook 32.

When a longitudinal force is applied to the improperly attached retractable window shade 23 as illustrated by the arrow L in FIG. 3, for example, when the sliding door 15 is opened and an upper rear corner 34 of the improperly attached retractable window shade 23 comes in contact with the vehicle 10, the front hook receiving slot 24 is detached from the front hook 30. Once the front hook receiving slot 24 is detached from the front hook 30, the improperly attached retractable window shade 23 retracts into the lower portion 18 of the sliding door 15.

Detachment of the front hook receiving slot 24 from the front hook 30 is accomplished by a back edge 36 of the front hook receiving slot 24 being pressed against a bottom portion 50 of the front hook 30 when the longitudinal force L is applied to the improperly attached retractable window shade 23. The bottom portion 50 outwardly urges the improperly attached retractable window shade 23 and the front hook receiving slot 24 towards a lip portion 60 of the front hook 30, and a top edge 38 of the front hook receiving slot 24 is urged up and over the lip portion 60.

Urging and detachment of the front hook receiving slot 24 of the improperly attached retractable window shade 23 is accomplished by the specially designed shape of the front hook 30 illustrated in FIGS. 5-8. The front hook 30 includes a body portion 70, the bottom portion 50, and the lip portion 60. As shown in FIG. 6, the front hook 30 has a J-shaped profile when viewed from the side, the body portion 70 being the tallest vertical portion of the J, the bottom portion 50 being the bottom valley portion of the J, and the lip portion 60 being the short vertical section of the J.

When viewed from the top, as shown in FIG. 7, the bottom portion 50 has a tapered profile 55. The tapered profile 55 of the bottom portion 50, extending from the body portion 70 to the lip portion 60, provides the outward urging force to the improperly attached retractable window shade 23 when the back edge 36 of the front hook receiving slot 24 is pressed against the bottom portion 50 of the front hook 30, for example by the longitudinal force L. The tapered profile 55 of the preferred embodiment is tapered between 20 and 70 degrees towards a center line 52 as illustrated by the angle θ in FIG. 7. It is appreciated that the tapered profile 55 need only be tapered on a side which comes in contact with the back edge 36 of the front hook receiving slot 24; however, providing the tapered profile 55 on both sides of the front hook 30 allows for a symmetrical part which could be interchangeable between both a right and left side of the vehicle 10.

In the preferred embodiment, the retractable window shade 22 is further enabled to release from the front hook 30 by the lip portion 60 when the lip portion 60 comes in contact with the back edge 36 and the top edge 38 of the front hook receiving slot 24. The lip portion 60 has a first arcuate profile 65 when viewed from the front as seen in FIG. 8, and has a second arcuate profile 67 when viewed from the side as shown in FIG. 6. In addition, FIG. 7 illustrates that the lip portion 60 has a tapered profile inwardly towards center line 52. In the preferred embodiment, the tapered profile of the lip portion 60 can be tapered between 20 and 70 degrees towards a center line 52 as illustrated by the angle θ in FIG. 7. The first arcuate profile 65 and the second arcuate profile 67 of the lip portion 60 assist in urging the front hook receiving slot 24 up and over the lip portion 60 when the longitudinal force L is applied to the improperly attached retractable window shade 23 and thereby ultimately allowing the retraction of the improperly attached retractable window shade 23 into the lower door portion 18. While the prefer embodiment utilizes the first actuate profile 65 and second arcuate profile 67, it is appreciated that other profiles may be used. For example the lip portion 60 could have front and side profiles that are tapered, beveled, chamfer, or any other shape known to those skilled in the art which provides a normal force that directs the retractable window shade up and over the lip portion 60.

It is appreciated that while the preferred embodiment uses the front hook 30 and the back hook 32 to secure the retractable window shade 22, other hook arrangements could be used. For example, one or more hooks could be placed between the front hook 30 and the back hook 32. These one or more hooks could have the special shape discussed above to allow detachment of a variably designed retractable window shade from the multiple hooks.

It is understood and appreciated that the foregoing drawings, discussion, and description are illustrative of specific embodiments of the present invention but they are not meant to be limitations upon the practice thereof. Numerous modifications and variations of the invention will be readily apparent to those of skill in the art in view of the teaching presented herein. It is the claims including all equivalents which define the scope of the invention.

The invention claimed is:

1. An assembly for covering a window of a door of a vehicle, the assembly comprising:
   a retractable shade having a slot with a back edge;
   a hook for retaining said shade, the hook mounted to the door of the vehicle;
   the hook having a bottom portion and a lip portion;
   the bottom portion having a tapered profile;
   wherein application of a longitudinal force generated by opening the door of the vehicle causes the back edge of the slot to abut the tapered profile of the hook, force thereby generated between the back edge and the tapered profile urges the retractable shade towards the lip portion and enables the detachment of the retractable shade from the hook.

2. The assembly of claim 1 wherein the lip portion has a first arcuate profile when viewed from a front view.

3. The assembly of claim 2 wherein the lip portion has a second arcuate profile when viewed from a side view.

4. The assembly of claim 3 wherein the first arcuate profile and the second arcuate profile urge the retractable shade upward and enables the detachment of the retractable shade from the hook upon application of a longitudinal force to the retractable shade.

5. The assembly of claim 1 wherein the bottom portion tapers inwardly towards a center line at a predetermined angle.

6. The assembly of claim 5 wherein the lip portion tapers inwardly towards a center line at the predetermined angle.

7. The assembly of claim 6 wherein the predetermined angle is between 20 and 70 degrees.

8. The assembly of claim 5 wherein the predetermined angle is between 20 and 70 degrees.

9. An assembly for providing a shade covering a window of a sliding door of a vehicle, the assembly comprising:
   a first hook,
   a second hook,
   a retractable shade,
   the first hook being mounted on a front portion of the sliding door above the window, the first hook having a bottom portion and a lip portion;
   the bottom portion having a tapered profile;
   the tapered profile being widest near the sliding door;
   the lip portion having a first arcuate profile when viewed from the front and a second arcuate profile when viewed from the side;

the second hook being mounted on a rear portion of the sliding door above the window;

the retractable shade being mounted in the sliding door under the window, the retractable shade being extendable over the window to attach to the first hook with a first hook receiving slot and to the second hook with a second hook receiving slot;

wherein the retractable shade detaches from the first hook and retracts upon an application of a longitudinal force to the retractable shade provided by operation of the sliding door when the retractable shade is attached to the first hook and not attached to the second hook.

10. The assembly of claim 9 wherein the bottom portion tapers inwardly towards a center line of the first hook at a predetermined angle.

11. The assembly of claim 10 wherein the predetermined angle is between 20 and 70 degrees.

12. The assembly of claim 11 wherein the vehicle is an automobile.

13. The assembly of claim 11 wherein the vehicle is a minivan.

14. The assembly of claim 11 wherein the sliding door is a powered sliding door.

15. A method for detaching a retractable shade covering a window of a sliding door of a vehicle, the method comprising:

providing a sliding door with a window;

providing a first hook, the first hook being mounted on a front portion of the sliding door above the window, the first hook having a bottom portion and a lip portion, the bottom portion having a tapered profile, the tapered profile being widest near the sliding door, the lip portion having a first arcuate profile when viewed from a front and a second arcuate profile when viewed from a side;

providing a retractable shade, the retractable shade being mounted in the sliding door under the window, the retractable shade being extendable over the window to attach to the first hook with a first hook receiving slot;

attaching the retractable shade to the first hook with the first hook receiving slot; and applying a longitudinal force to the retractable shade, the longitudinal force provided by operation of the sliding door, the longitudinal force causing the retractable shade to detach from the first hook and retract into the sliding door.

\* \* \* \* \*